United States Patent

[11] 3,599,622

| [72] | Inventor | Frank C. Baron |
| | | 20302 Germain St., Chatsworth, Calif. 91377 |
| [21] | Appl. No. | 843,034 |
| [22] | Filed | July 18, 1969 |
| [45] | Patented | Aug. 17, 1971 |

[54] CIRCULAR SAW CONSTRUCTION
4 Claims, 8 Drawing Figs.

| [52] | U.S. Cl. | 125/15 |
| [51] | Int. Cl. | B28d 1/04 |
| [50] | Field of Search | 51/206; 125/15 |

[56] References Cited
UNITED STATES PATENTS

| 3,291,583 | 12/1926 | Lindblad | 125/15 X |
| 3,092,094 | 6/1963 | Griffin | 125/15 |
| 3,128,755 | 4/1964 | Benson | 125/15 |
| 3,064,399 | 11/1962 | Anderson | 125/15 X |
| 3,048,160 | 8/1962 | Griffin | 125/15 |

*Primary Examiner*—Harold D. Whitehead
*Attorney*—Perry E. Turner

ABSTRACT: Slotted concrete saw blades are shown in which the edge and slot thicknesses are constituted of the combined thicknesses of layers of wear-resistant material and a core rim which is thinner than the main core body, and wherein the wear-resistant layers extend below the bottoms of the slots. Cutting heads or segments are bonded to such composite peripheral edge surface. In various embodiments, the wear-resistant layers include portions intermediate adjacent slots which extend below the bottoms of the slots. Further, in addition to radial slots, a saw blade is shown with slots formed along lines at substantial angles to the radii, and in one embodiment adjacent slots are along lines at respective positive and negative angles with respect to the radii.

PATENTED AUG 17 1971 3,599,622
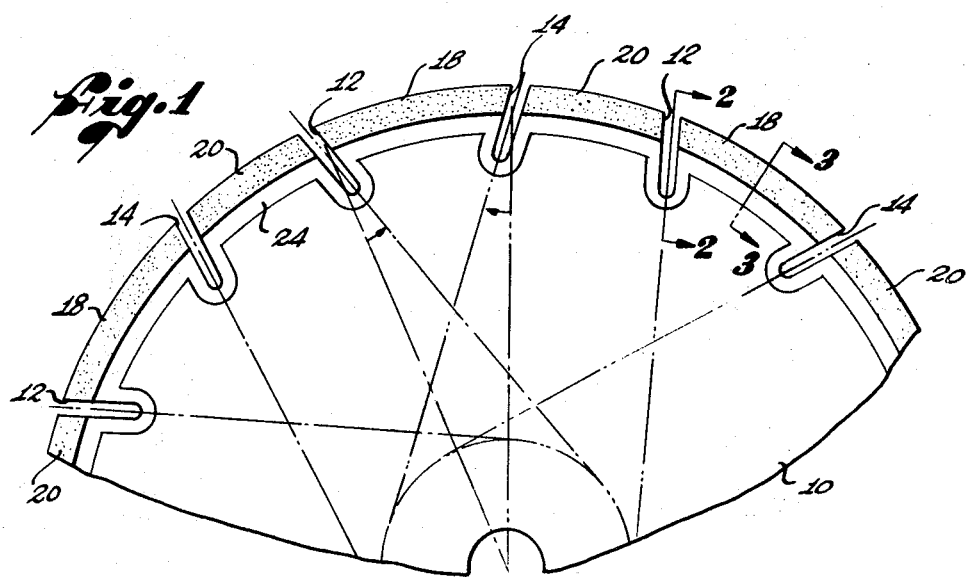
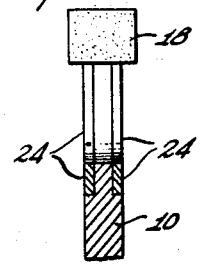 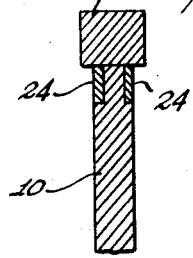 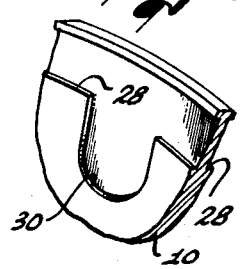 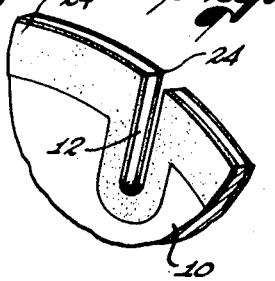
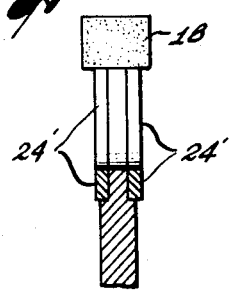
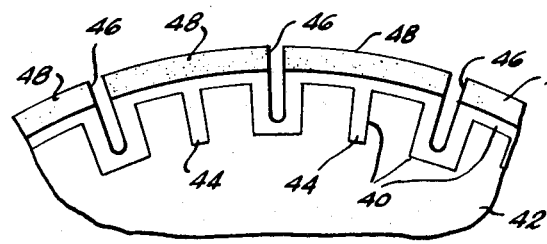
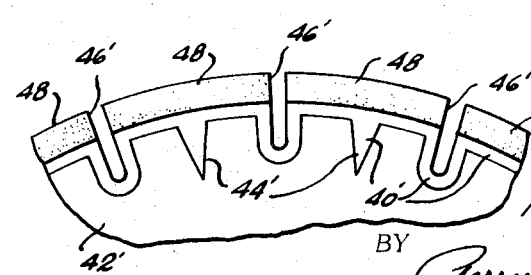
INVENTOR.
FRANK C. BARON
BY
Perry E. Turner
ATTORNEY 3,599,622

CIRCULAR SAW CONSTRUCTION

BACKGROUND OF THE INVENTION

1. Field of the Invention

This invention relates to a saw blade construction, and more particularly to circular saws for cutting concrete, stone and the like.

2. Description of the Prior Art

In making circular saws for cutting concrete and the like, considerable time, effort and expense have been devoted to the problem of minimizing wear of the core in an attempt to prolong its life and thereby obtain maximum use of the cutting heads bonded to the periphery of the core. However, the various structures heretofore known for accomplishing this purpose have fallen short of their goal. Such structures include the provision of hardened inserts in the core which are placed between the slots and adjacent the outer ends of the slots. In another approach, grooves are formed in the faces of the core below its periphery, such grooves extending between the radial faces of adjacent slots, and such grooves are filled with hardened material.

During cutting operations by such prior art blade structures, substantial wear of the core occurs at the faces thereof immediately adjacent the cutting segments mounted on its periphery, thereby weakening the core and causing the cutting segments to be broken off. Additionally, there is considerable wear of the portions of the slots below the hardened inserts or hardened face material. Such wear results in such widening of the slots and thinning of the core that the core soon fractures and breaks. Such breakage occurs and renders the blade useless even though the cutting segments are in good condition. This represents a considerable loss in investment to the user since the cutting heads, which employ diamond particles, are quite expensive.

SUMMARY OF THE INVENTION

This invention embraces a slotted disk saw construction having cutting segments bonded to its periphery, wherein the faces at the rim of the core include wear-resistant material extending completely around each slot, between the slots, and flush with the peripheral edge surface of the core. My invention also embraces such cores wherein the slots are other than radial, and such cores wherein the wear-resistant material intermediate the slots at each face include portions which extend radially to a point below the bottoms of the slots. The wear-resistant material around the slots prevents wear and consequent fracture of the core in the vicinity of the slots, and complete elimination of relatively soft core material as a wearing surface immediately adjacent the cutting segments avoids wear and premature breakage that is characteristic of prior art blades. Thus, my invention assures longer core life than has heretofore been possible, whereby longer and more effective use of the expensive cutting segments is realized than has heretofore been possible Further, in cores of my invention where the slots are other than radial, the blade operates with a pumping action that is markedly more effective than for blades with radial slots. —

BRIEF DESCRIPTION OF THE DRAWING

FIG. 1 is a partial side elevation view of one form of cutting saw of my invention, showing the continuous wear-resistant material extending from the lower surfaces of the cutting segments and around the slots, and showing slot orientations for achieving effective pumping action;

FIG. 2 is a sectional view taken along the line 2–2 of FIG. 1;

FIG. 3 is a sectional view taken along the line 3–3 of Fig. 1;

FIG. 4 is a fragmentary view in perspective of the rim portion of a core preparatory to applying wear-resistant material thereto, showing the opposite faces undercut and including an inwardly extending groove in the vicinity where a slot is to be formed;

FIG. 5 is a fragmentary perspective view of the rim portion of the core after the wear-resistant material is applied to its faces and a slot has been formed therein;

FIG. 6 is a fragmentary sectional view similar to FIG. 2, but showing the wear-resistant material of such thickness as to make the rim portion of the core thicker than the remainder thereof;

FIG. 7 is a partial side elevation view similar to FIG. 1, but showing the saw with radial slots, and showing portions of wear-resistant material intermediate the slots extending to a depth below the bottoms of the slots; and FIG. 8 is a partial side elevation view similar to FIG. 7, but showing different shapes for the portions of the wear-resistant material intermediate the slots.

DESCRIPTION OF ILLUSTRATIVE EMBODIMENTS

Referring to FIGS. 1—3, a circular core 10 has a plurality of spaced slots 12, 14 extending from its periphery. Alternate slots 12 are formed along lines which are at a counterclockwise angle from their radii, and the remaining slots 14 are formed along lines which are at a clockwise angle with respect to their radii. For convenience, the slots 12, 14 are referred to as "hooked," with the slots 12 being referred to as having a positive hook and the slots 14 being referred to as having a negative hook. The hook angle in one example is 20°, but may be larger or smaller.

Cutting segments 18, 20 are secured to the periphery of the core 10, such cutting segments extending between the slots and having their end faces lying in the planes of the faces of the slots to which they extend. A cutting saw of this construction is one in which, for clockwise rotation thereof, the slots 12 with a positive hook provide the more effective pumping action, and the other slots with a negative hook provide the more effective pumping action during counterclockwise rotation. In this connection, it will be seen that the slots constitute passages for receiving the particles ground off material being cut by the cutting segments. Such particles are carried in the slots to the surface where they are thrown outwardly due to centrifugal force.

If desired, of course, all slots may be provided with the same hook. If so, more effective pumping action is obtained in one direction of rotation of the saw than the other.

For cutting saws with slots as above described, or with radial slots as in conventional saws, a saw construction of my invention includes means to prevent premature wear of the core in the vicinities of the slots and the cutting segments. In this connection, I form the faces of the rim portion of the core 10 with layers 24 having a greater hardness than that of the material of the core 10. The core may be hardened steel having a Rockwell C hardness of, e.g., 30—40, and the layers 24 may be a hard facing material, such as a tungsten-cobalt base alloy having a substantially higher Rockwell C hardness (e.g., 50—60).

As illustrated, the layers 24 are formed in undercut portions in the faces of the core, and the peripheral edge surfaces of the layers 24 are flush with the peripheral edge surface of the thin rim portion of the core. In this connection, and referring to FIGS. 4 and 5 along with FIGS. 1—3, the rim of the core 10 is initially undercut at 28, such undercut including spaced inwardly extending grooves 30 at locations where slots are to be formed.

Material to form the hard face layers 24 is then placed in the undercut portions 28 and grooves 30 thereof. Desirably, such hardened material is built up, as from a welding rod, after which it is machined ground smooth so their peripheral edge surfaces are flush with the peripheral edge surface of the core and the lateral surfaces of the layers 24 are flush with the faces of the body of the core. If desired, of course, the finished layers may be raised with respect to the body of the core, e.g., as indicated by the layers 24' in Fig. 6. It will be apparent that the layers 24 can be formed in other ways, e.g., by arc-welding or by filling the grooves with powdered wear-resistant material at fusing temperatures as in a spray or by heating in a furnace.

Next, the slots are machined in the periphery of the core and layers 24 at the desired angles. Such slots are confined within the boundaries of the undercut grooves 30 (FIG. 4). Thereafter, the cutting segments are bonded to the flush peripheral edge surfaces of the core and layers 24, as by silver soldering or any other suitable bonding technique such as welding or brazing.

In the operation of a saw construction with hard facing layers 24 as above described, substantially little core wear occurs within the slot. Also, substantially negligible wear occurs at the junctions of the cutting segments and the layers 24. Accordingly, a saw construction of my invention is characterized in that it does not receive the life-shortening wear that occurs in cores of the prior art. Therefore, my invention provides the user with a saw structure which has a substantially longer operating life than those heretofore known, and which substantially reduces the investment heretofore required in replacement with new cutting segments.

FIG. 7 illustrates a cutting saw of my invention wherein the hard facing layers 40 in a core 42 are formed in undercuts as previously described, but wherein the undercut grooves around the slots are rectangular. Further, intermediate the slots, the undercut is formed with additional grooves filled with hard facing material, as indicated at 44. The core 42 in this example is shown with conventional radial slots 46 and cutting segments 48 of equal length.

FIG. 8 illustrates a saw construction similar to FIG. 7, the like parts of which are indicated by prime numbers. In Fig. 8, the hard facing layers 40' are shown with curved portions around the slots 46' as in the examples shown in FIG. 1, and with pointed portions 44' in place of the rectangular portions 44 intermediate the slots. As with the intermediate portions 44 in FIG. 7, the inner ends of the portions 44' are located on a circumference of smaller radius than that of the bottoms of the slots 46'.

The intermediate portions 44 of FIG. 7 and 44' of FIG. 8 furnish additional means for minimizing core wear. In this connection, wear of core material immediately adjacent the leading edges of the intermediate portions 44, 44' results in a deformation which directs the particles outwardly from the core faces. Similar deformation and action takes place at the leading edges of the portions of the layers 40, 40' around the slots. However, these latter deformations are less pronounced than would be the case in the absence of the intermediate portions 44, 44'.

It will be apparent that my invention embraces various modifications in the saw constructions illustrated and described herein. For example, the undercuts in the hard facing material therein may be formed so that their inner profile is serpentine or any other shape desired. What is essential is that such inner profile include portions which wrap around the slots, and that the peripheral edge surfaces of the wear-resistant layers be flush with the peripheral edge surface of the core.

I claim:

1. A saw comprising:
   a circular core body having a plurality of spaced slots extending inwardly from its periphery;
   a circumferentially continuous layer of wear-resistant material on each face of said body,
      the peripheral edge surfaces of said layers being flush with the peripheral edge surface of said body,
      each layer having spaced portions extending radially inward a substantially greater distance than the remainder thereof,
      said spaced portions also extending radially inward a greater distance than the bottoms of said slots,
      said layers having slots in spaced portions thereof that are flush with the slots in said body,
      whereby wear-resistant material wraps entirely around each slot;
   and cutting segments bonded in place against the peripheral edge surfaces of said body and said layers,
      each segment extending between adjacent slots.

2. The combination of claim 1, wherein each layer has spaced portions intermediate its slots that are narrower than, but which extend inwardly at least the same radial distance as, the slotted portions thereof.

3. The combination of claim 1, wherein the combined widths of the peripheral edges of said body and said layers is less than the width of a cutting segment and equal to or greater than the thickness of the center portion of said body.

4. The combination of claim 1, wherein alternate slots have a positive hook and the remaining slots have a negative hook.